UNITED STATES PATENT OFFICE 2,052,289

FAT STABILIZATION

Donald P. Grettie, Chicago, Ill.

No Drawing. Application April 20, 1936,
Serial No. 75,423

10 Claims. (Cl. 99—163)

This invention relates to an improved process of treating edible fats and oils and more particularly to a process of stabilizing shortening products such as lard against rancidity.

This application is a continuation in part of my application entitled Lard stabilization, Serial No. 682,118, filed July 25, 1933.

One of the objects of the present invention is to provide a method for stabilizing edible fats and oils such as lard, beef fat, hydrogenated cottonseed oil and other similar vegetables and animal fats and oils and materials thereof against rancidity.

Another object of the invention is to provide as an article of commerce, an improved shortening product stabilized against rancidity.

For the purpose of illustration, but not by way of limitation, the invention is hereinafter described as practiced with lard. As is well known, lard, like other of the animal and vegetable oils and fats, tends to become rancid when exposed to atmospheric oxygen. The effect of various substances of a chemical nature in promoting or retarding the tendency of fats and oils to become rancid has been studied by numerous investigators.

The present invention is based upon the discovery that the tendency of lard to become rancid can be retarded by treatment with crude soya bean oil. This invention permits the stabilizing of lard against rancidity without in any way affecting the characteristic dry rendered or kettle rendered lard flavor which is considered desirable by the trade, in such uses of lard in cracker manufacturing and the like where a carry-over of the lard flavor to the end product is desirable.

In practice, I have successfully stabilized lard by adding a small percentage of crude soya bean oil to lard in a molten condition. I have discovered that crude soya bean oil has a marked stabilizing action on lard which is lost by refining.

I am aware that soya bean oil has been refined for use in various ways. However, I believe that my discovery of the stabilizing action of crude soya bean oil is a new and valuable discovery.

The following table sets out data on actual tests carried out to demonstrate the value of the present invention of stabilization of lard:

The samples in the following table are designated by the number here assigned:
1. Lard—control sample.
2. Lard containing 5% of crude soya bean oil.
3. Lard containing 10% of caustic refined soya bean oil.

Table

| No. hrs. incubation at 70° C. | Milli-equivalents of active oxygen per kilo of fat | | |
|---|---|---|---|
| | 1 | 2 | 3 |
| 44 | 3.0 | 1.5 | 7.0 |
| 75 | 7.0 | 4.0 | 10.0 |
| 120 | 40.0 rancid | 13.0 | 23.0 |
| 148 | | 12.0 | 29.0 faintly rancid |
| 237 | | 19.0 | 83.0 rancid |
| 290 | | 26.0 | |
| 320 | | 38.0 faintly rancid | |
| 390 | | 76.0 strongly rancid | |

It would seem clear from tests that the bodies having antioxidant properties are present in crude soya bean oil and destroyed by caustic refining.

It is particularly significant to note that the stabilizing effect of the soya bean oil carries over into pie crust baked with lard so stabilized as the shortening ingredient. This property of soya bean oil when used as a stabilizer is of considerable practical importance since most stabilizing agents do not carry over the antioxidant properties to the bakery product in which they are used.

The deodorization process to which shortening is subjected is carried on at temperatures above 100° C., which temperatures are sufficiently high to destroy lecithin.

The antioxidant bodies which I have discovered to be present in crude soya bean oil are clearly something other than lecithin since lecithin would be destroyed by the temperatures of deodorization, during which process steam is passed through the melted fat or oil.

Furthermore, the antioxidant effect secured by the use of crude soya bean oil in accordance with the present invention carries through to the bakery product prepared with the shortening whereas the antioxidant effect of lecithin does not stabilize the fat in the bakery product after baking.

Although by way of illustration I have discussed lard in describing my invention, it will be understood that the present invention is not limited to lard but comprehends edible vegetable and animal fats and oils adapted for use as shortening and the like. The word "shortening" as used in this specification and the claims which follow is understood to include edible animal and vegetable fats and oils such as lard, beef fat, hydrogenated cottonseed oil, cottonseed oil and the like.

The term "crude soya bean oil" as used in the foregoing specification and the following claims designates oil expressed, extracted or otherwise obtained from soya beans, which oil has not been subjected to the usual process of washing with a caustic solution. The term as used is broad enough to include soya bean oil where the soya bean oil has been filtered, strained, or otherwise treated, provided only that the soya bean oil has not been subjected to a treatment with caustic solution.

I have found in practice that effective stabilization may be secured with varying amounts of crude soya bean oil. In most instances, it is sufficient to incorporate from 1 per cent to 5 per cent of crude soya bean oil in the shortening to be stabilized. It will be understood, of course, that some stabilization is secured with smaller amounts, and that the effect is progressive as the amount is increased.

I claim:

1. The method of stabilizing lard which comprises adding thereto and thoroughly incorporating therewith a quantity of crude soya bean oil.

2. The method of stabilizing lard which comprises adding thereto and thoroughly incorporating therewith from 1 per cent to 10 per cent of crude soya bean oil.

3. The method of stabilizing lard which comprises adding thereto and incorporating therewith crude soya bean oil which has been hydrogenated to about the consistency of the lard being treated.

4. As an article of commerce, a shortening product stabilized against rancidity consisting of 90 per cent to 95 per cent lard and a complement of crude soya bean oil.

5. As an article of commerce, a shortening product stabilized against rancidity consisting of a large proportion of lard and a complement of crude soya bean oil.

6. The method of stabilizing shortening which comprises adding thereto and thoroughly incorporating therewith a quantity of crude soya bean oil.

7. As an article of commerce, a shortening product stabilized against rancidity consisting of a large proportion of shortening and a complement of crude soya bean oil.

8. The method of stabilizing shortening which comprises adding deodorized crude soya bean oil thereto.

9. The method of stabilizing shortening which comprises adding crude soya bean oil thereto and thereafter deodorizing the mixture at sufficiently high temperatures to destroy lecithin.

10. As an article of commerce, a shortening product stabilized against rancidity consisting of a large proportion of fat and a complement of deodorized crude soya bean oil.

DONALD P. GRETTIE.